US009670746B2

(12) United States Patent
Bauer et al.

(10) Patent No.: US 9,670,746 B2
(45) Date of Patent: Jun. 6, 2017

(54) DEVICE FOR ADJUSTING A MEDIA PRESSURE RELATIVE TO AN AMBIENT PRESSURE

(71) Applicant: HYDAC TECHNOLOGY GMBH, Salzbach/Saar (DE)

(72) Inventors: Frank Bauer, Marpingen (DE); Martin Groben, Sulzbach (DE); Alexander Albert, Wallerfangen (DE)

(73) Assignee: HYDAC TECHNOLOGY GMBH, Sulzbach/Saar (DE)

( * ) Notice: Subject to any disclaimer, the term of this patent is extended or adjusted under 35 U.S.C. 154(b) by 0 days.

(21) Appl. No.: 14/899,187

(22) PCT Filed: Jun. 26, 2014

(86) PCT No.: PCT/EP2014/001740

§ 371 (c)(1),
(2) Date: Dec. 17, 2015

(87) PCT Pub. No.: WO2015/000565

PCT Pub. Date: Jan. 8, 2015

(65) Prior Publication Data

US 2016/0138357 A1 May 19, 2016

(30) Foreign Application Priority Data

Jul. 3, 2013 (DE) ........................ 10 2013 011 115

(51) Int. Cl.

| | |
|---|---|
| ***F16L 55/04*** | (2006.01) |
| ***E21B 33/064*** | (2006.01) |
| ***F15B 1/10*** | (2006.01) |

(52) U.S. Cl.
CPC ............ *E21B 33/064* (2013.01); *F15B 1/103* (2013.01); *F15B 2201/3153* (2013.01)

(58) Field of Classification Search
CPC .. F15B 1/103; F15B 1/086; F15B 1/24; F15B 2201/3153; F15B 2201/31
(Continued)

(56) References Cited

U.S. PATENT DOCUMENTS 2,365,994 A * 12/1944 Ashton ..................... F15B 1/08 138/31
2,722,188 A 11/1955 Clemens
(Continued)

FOREIGN PATENT DOCUMENTS

CN 102678680 9/2012
DE 10 2011 009 276 7/2012
(Continued)

OTHER PUBLICATIONS

International Search Report (ISR) issued May 12, 2015 in International (PCT) Application No. PCT/EP2014/001740.

*Primary Examiner* — Patrick F Brinson
(74) *Attorney, Agent, or Firm* — Wenderoth, Lind & Ponack, L.L.P.

(57) ABSTRACT

A device (1) adjusts a media pressure relative to an ambient pressure defined by a depth-dependent sea water pressure during use of the device (1). The sea water pressure acts on a compensator device (35) that permits a reversible change in length or elongation. At least two compensator elements (41) of the compensator device (35) are provided in series in the direction of the change in length or elongation.

17 Claims, 2 Drawing Sheets

(58) Field of Classification Search
USPC ........................................... 138/26, 30, 31
See application file for complete search history.

(56) References Cited

U.S. PATENT DOCUMENTS

| | | | | |
|---|---|---|---|---|
| 3,336,948 | A | 8/1967 | Lucien | |
| 3,552,419 | A | 1/1971 | Weston | |
| 4,997,009 | A * | 3/1991 | Niikura | B60G 17/0424 138/30 |
| 6,418,970 | B1 | 7/2002 | Deul | |
| 6,923,223 | B2 * | 8/2005 | Trzmiel | F15B 1/103 138/30 |
| 7,520,129 | B2 | 4/2009 | Springett | |
| 8,201,582 | B2 * | 6/2012 | Stroganov | F15B 1/086 138/30 |
| 8,418,727 | B2 * | 4/2013 | Hummelt | F15B 1/106 138/30 |
| 8,443,841 | B2 * | 5/2013 | Wellner | F15B 1/103 138/30 |
| 2003/0111124 | A1 * | 6/2003 | Gray, Jr. | F16L 55/053 138/30 |
| 2005/0155658 | A1 * | 7/2005 | White | F16L 55/053 138/31 |
| 2011/0203379 | A1 | 8/2011 | Virtanen et al. | |
| 2012/0291688 | A1 | 11/2012 | Dawes | |
| 2013/0061937 | A1 | 3/2013 | Nellessen, Jr. et al. | |

FOREIGN PATENT DOCUMENTS

| | | |
|---|---|---|
| GB | 1 305 990 | 2/1973 |
| GB | 2 328 492 | 2/1999 |
| WO | 2013/039719 | 3/2013 |

* cited by examiner

DEVICE FOR ADJUSTING A MEDIA PRESSURE RELATIVE TO AN AMBIENT PRESSURE

FIELD OF THE INVENTION

The invention relates to a device for adjusting a media pressure relative to an ambient pressure defined by a depth-dependent seawater pressure when using the device. The seawater pressure is applied to a compensator device, which permits a reversible change in length or elongation.

BACKGROUND OF THE INVENTION

The decrease in the availability of resources drives ever-increasing efforts in the extraction of raw materials and energy. As a result, offshore drilling for oil and gas has to be carried out in increasingly greater depths. For the safe operation of such deep-water drilling carried out from drilling rigs or drilling vessels, extensive security systems are provided on the seabed, which systems are functionally associated with the transition region between the borehole and drill pipe or production tubing. A blowout preventer (BOP) constitutes an important piece of equipment that is a standard safety device in such deep-water drills. This device instigates a quick closing of the wellhead, drill pipe and/or the conveying tube in the event of danger.

To ensure the reliable function of a blowout preventer, a pressure medium for the hydraulic actuation having a correspondingly high working pressure has to be provided. Since transporting a sufficient amount of a hydraulic fluid having a sufficiently high operating pressure from a drilling platform or a drilling vessel at the surface of the water to the seabed below is extremely difficult, the state of the art, cf. U.S. Pat. No. 6,418,970 B1, uses the hydraulic operating pressure required for the actuation of corresponding deep-water installations in these devices at the location of the deep-water installation itself. To this end, the surrounding pressure of the deep sea, i.e., the high pressure of the deep water, is used to produce the required hydraulic operating pressure. The ambient pressure of the deep sea is applied to a piston in a cylinder. The resulting piston movement is used to transfer the pressure to the pressure fluid.

Despite the advantages resulting from the production or transfer of the operating pressure at the place of action, the operating characteristics of the known devices are not satisfactory. The use of seawater for the operation of the cylinder assembly is questionable in several respects. On the one hand, there is a risk of pollution caused by the entry of sediment particles and the like, or by microorganisms introduced in conjunction with the seawater. On the other hand, there are drawbacks due to the extremely corrosive seawater. To counter the corrosion, the prior art needs to provide the cylinder arrangement with suitable linings and/or to manufacture it of suitably corrosion-resistant materials to reduce corrosion and/or to reduce the coefficient of friction, increased by accumulations, for piston movements. Despite these measures, difficulties are caused by saltwater deposits, for instance by potassium stearate.

To overcome these challenges, a device for transmitting a hydraulic working pressure in a hydraulic fluid to the hydraulic pressure actuating devices of deep-water installations, especially deep-water drilling, is suggested in DE 10 2011 009 276 A1. In a cylinder arrangement, a first pressure chamber for the hydraulic fluid, a movable piston assembly for changing the volume of this pressure chamber and at least a second pressure chamber are provided. The ambient pressure of the deep sea can be applied to the second pressure chamber for a movement of the piston assembly generating the operating pressure in the first pressure chamber. Also, a pressure accumulator associated with the cylinder assembly is provided in the form of a bladder accumulator, whose the movable separating member separates a chamber connected to the sea water from a chamber for movement. The actuating chamber contains an actuating fluid and is connected to the second pressure chamber to pressurize it to the deep-sea pressure by the actuating fluid.

SUMMARY OF THE INVENTION

Based on this prior art, the invention is based on solving the problem of providing a device for adjusting a media pressure relative to an ambient pressure, in particular when used underwater, that is robust, that is inexpensive to manufacture and that can, if necessary, be easily replaced.

A solution of this problem, according to this invention, involves of a device having at least two compensator elements of the compensator device in series in the direction of the change in length or elongation.

The compensator device at least partially protects the device from the corrosive seawater. Surprisingly, the usage of such a compensator device has been demonstrated to be inexpensive, if it prevents expensive components from coming into contact with the seawater and they are thus preserved. Further, the series connection of two or more compensator elements effects a redundancy. In addition, such compensator elements have proven to be more robust than the bladder accumulator known from the prior art.

The solution according to the invention can be used to adjust the media pressure in such a way that a compensation of the seawater pressure relative to a hydraulic operating pressure in the fluidic circuit of hydraulic equipment, in particular a blowout preventer, connected to the device, can be achieved. Moreover, the adjustment of the media pressure can be used to bias the operating pressure of the fluid operating circuit using the seawater pressure. When required, for example, in an emergency situation, the biased and hence very high operating pressure, which essentially corresponds to the seawater pressure, can then be used directly for the operation of the connected operating equipment.

The respective compensator elements are advantageously at least partially resilient or otherwise elastically formed and undergo the change in length or elongation in one direction from an initial position by seawater pressure, and can be returned to this initial position upon removal of the seawater pressure in a reverse movement. This embodiment also permits the usage with different seawater pressures.

Accordingly, the device can also be used at different depths. Furthermore, the elasticity of the compensator elements makes for the repeated usage of the device.

The compensator device may be advantageously formed from a bellows. The compensator elements can be formed from individual bellows folds arranged in sequence, at least partially forming the wall of the bellows. Such bellows has proved to be particularly robust and durable when used in the deep sea. Another advantage is that the device operates properly even at very high seawater pressure, and no diffusion through the bellows can occur.

In individual cases, at least one frontal sealing wall of the bellows and/or a pressure transmission device is exposed to seawater. This sealing wall is preferably set back in the direction of the pressure transmission device relative to an entry point of the sea water. That frontal sealing wall permits a shielding of the pressure transmission device from the seawater. Furthermore, at least parts of the device according to the invention are protected from the seawater.

Particularly advantageously, the compensator device and/or the pressure transmission device form at least one media-tight seal between a seawater chamber exposed to sea water pressure and the media chamber having media pressure within a joint supporting housing. In this way, the media chamber is safely separated from the seawater chamber. The transfer of the respective media is impossible. Accordingly, damage to downstream units that may only come into contact with the medium, but not with the seawater, is prevented.

In a chain of action and preferably viewed in the longitudinal direction of the supporting housing, the pressure transmission device and then the media chamber can be advantageously connected to the compensator device. This design is particularly compact and is advantageously characterized by the uniform movement direction within the device. The movement does not have to be deflected by mechanical or hydraulic interlinks. Such power transmissions with changes in direction are regularly associated with energy losses that are avoided in the device according to the invention.

The pressure transmission device may comprise a double piston, one piston being adjacent to the seawater chamber and the other piston adjacent to the media chamber. That double piston design has the advantage that an intermediate chamber is formed between the two pressure chambers, which can be used for additional sealing purposes.

At least one additional second media chamber holding a high-pressure medium is advantageously arranged between the double pistons. The high-pressure medium may be a process gas, in particular nitrogen ($N_2$), at a pressure of at least 1 bar, more preferably at least 100 bar, more preferably at least 200 bar, more preferably at least 300 bar, more preferably 400 bar.

The second media chamber having the high-pressure medium is advantageously permanently connected to a pressure reservoir. The pressure reservoir may concentrically envelop the supporting housing. This arrangement is advantageous in terms of an efficient usage of the available space as it is very compact. By connecting an extended pressure reservoir a higher pressure can be provided via a longer stroke. The medium in the first media chamber is then pressurized both by the ambient pressure of the sea water as well as by the pressure of the high-pressure medium. The second media chamber and/or the pressure reservoir may also be formed outside the device by an extra component, for example, in the form of a separate accumulator device that can be connected to the device.

At least one additional, third media chamber accommodating a low-pressure medium, in particular in the form of a vacuum, may be disposed between the double pistons. The second and third media chambers can be bordered by a piston partition wall. In that partition wall, a piston rod, at whose respective end a piston of the piston assembly is mounted, is guided in a longitudinally displaceable manner. The low-pressure medium, in particular a process gas, such as nitrogen ($N_2$), or the vacuum takes pressure off the piston pressurized by the ambient pressure of the sea water, on the opposite side. Hence, there is very little or no resistance to the movement of the piston when the medium is drawn from the first media chamber. In particular, the low-pressure medium in the third media chamber is pressurized at less than 1 bar, preferably less than 0.5 bar.

The bellows, pistons and piston partition wall may preferably have a respective maximum outer diameter, which is equal and corresponds to the uniform inner wall diameter of the supporting housing. In this way, the supporting housing can be designed tubular. The supporting housing is thus particularly inexpensive to manufacture and resistant to ambient pressure conditions.

At least the piston of the double piston arrangement that is adjacent to the seawater is advantageously sealed with respect to an inner wall of the supporting housing by a sealing device. In this way, the penetration of the seawater into the double piston arrangement is prevented. Furthermore, a leakage of media or process gas from the double piston assembly in the direction of the seawater is prevented.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
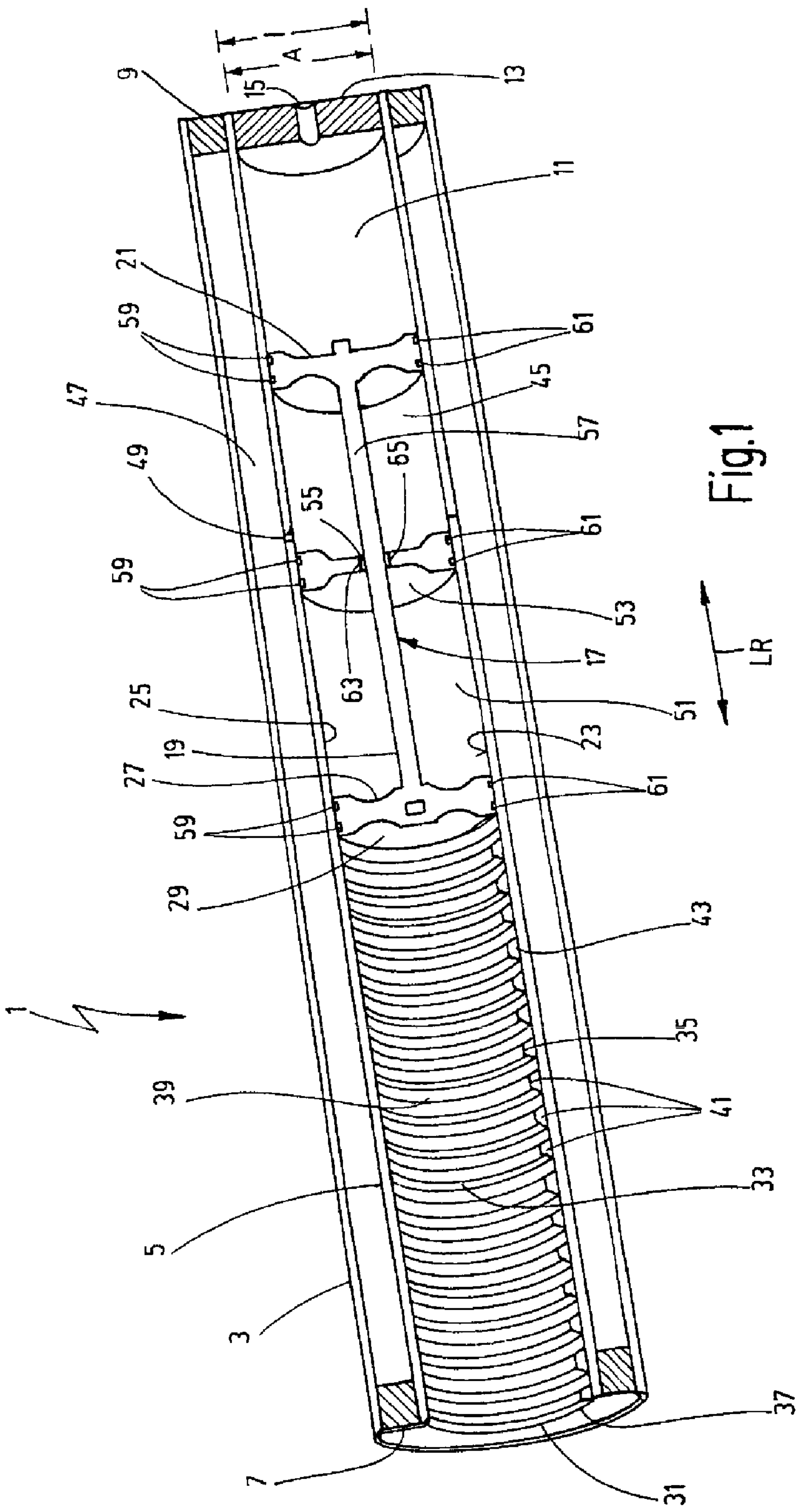
FIG. 1 is a perspective view in partial section of a device according to an exemplary embodiment of the invention.

FIG. 1 shows the device 1 for adjusting a media pressure relative to an ambient pressure, which ambient pressure is defined by a depth-dependent pressure of the seawater when device 1 is in use. The device 1 comprises essentially of two concentric pipes 3, 5. The ends of the pipes 3, 5 are held apart by the ring elements 7, 9. In the inner pipe 5, which forms a supporting housing, a first media chamber is provided and is sealed off by an end disk 13. The disk 13 is provided with an axial bore 15 for the transfer of one medium from the first media chamber 11 into a downstream hydraulic circuit having connected operating equipment, not illustrated in detail, for example in the form of a blowout preventer. The first media chamber 11 can be pressurized by a pressure transmission device 17 in the form of a double-piston arrangement 19. The right (in the image plane) or first piston 21 of device 17 is adjacent to the first media chamber 11. The double piston assembly 19 is guided in an axially movable manner in the supporting housing 5. An inner wall 23 of the supporting housing 5 forms a running or sliding surface 25 for the pistons 21, 27. The left (in the image plane) or second piston 27 of the double piston assembly 19 can be pressurized by seawater as a frontal sealing wall 29 during operation of the device. This frontal sealing wall 29 is set back with respect to an entry point 31 of the seawater in the direction of the pressure transmission device 17. The pressure transmission device 17 thus forms a media-tight seal between a seawater chamber 33 exposed to seawater pressure and the media chamber 11 having media pressure within the joint supporting housing 5.

On the inside of the supporting housing 5, between the left piston 27 and the inlet point 31 of the inner pipe 5, a compensator device 35 is provided. The seawater pressure acts on the compensator device 35, which permits a reversible change in length or elongation. The compensator device 35 is formed from a bellows 39. The bellows 39 is made of corrosion-resistant stainless steel materials. At its one free end, the bellows 39 is welded to the inner pipe 5 in the area of the entry point 31. At the other end in bias operation the bellows 39 touches the outer peripheral edge of the adjacent front end of the left piston 27 preferably loosely. Preferably, between the bellows 39 and the inner wall 23, to the extent attributable, of the pipe 5, in addition a support fluid is introduced, for example, in the form of an alcohol compound (glycol), stiffening and in this respect supporting the distances between the bellows folds. Part of the support fluid, as a kind of replenishment to compensate for fluctuations in volume when the spring bellows or bellows 39 moves, is located between the closed bottom end thereof and the adjacent end wall 29 of the leftmost piston 27 in the viewing direction of FIG. 1. The bellows 39 is arranged coaxially to the pressure transmission device 17.

Figure 2:
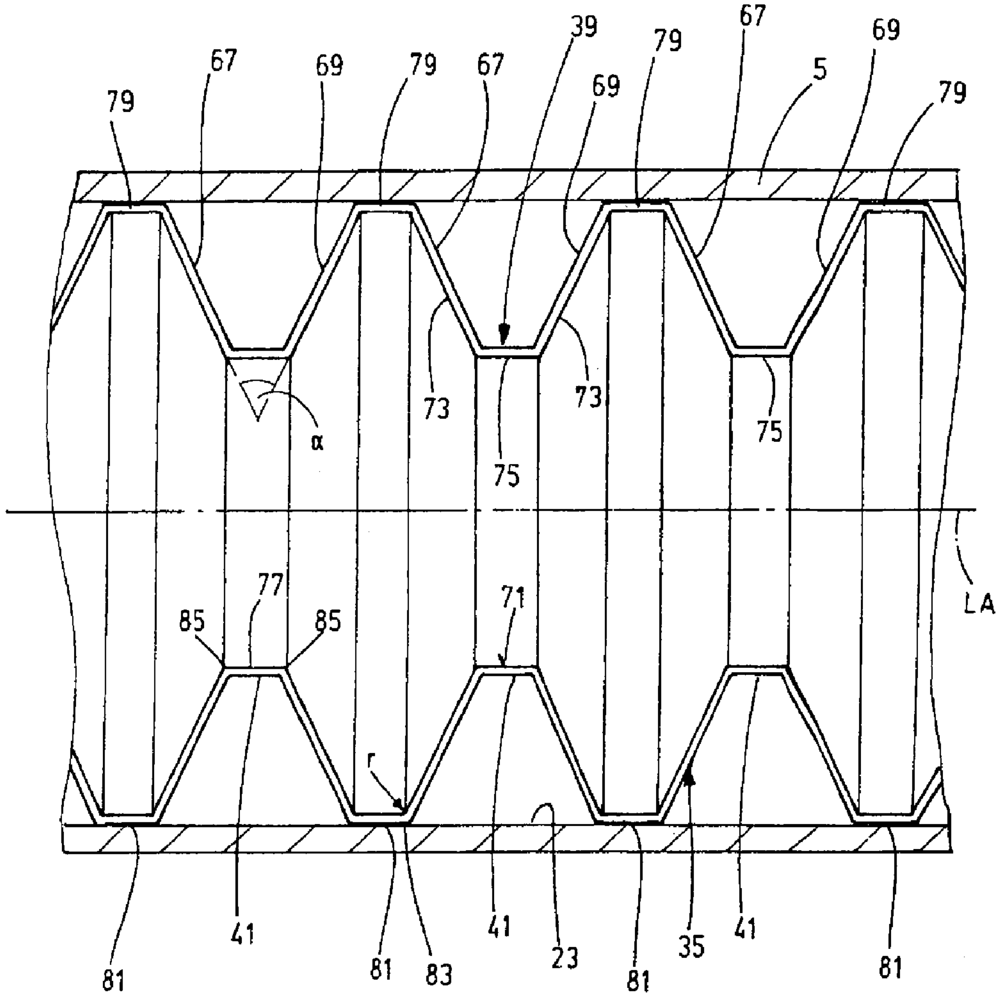
FIG. 2 is a side view in section of a detail of the bellows of FIG. 1.

According to the invention, several two compensator elements 41 of the compensator device 35 are provided in series, in the direction of the change in length or elongation. The compensator elements 41 are formed of individual bellows folds, trapezoidal in longitudinal section and arranged in series. The bellows folds 41 form a wall 43 of the bellows 39. On the outside they are in contact with the inner wall 23 of the supporting housing 5. The respective compensator elements 41 are resilient. Starting from an initial position, the compensator elements 41 are subject to a change in length or elongation in one direction by seawater pressure. Upon removal of the seawater pressure, the compensator elements can be returned to the initial position in a reverse movement. The operating capacity of the device and the volume of the seawater chamber can thus be at least partially defined by the number and shape of the bellows folds 41. The bellows 39 shown in FIGS. 1 and 2 is formed from an elastomeric material (rubber), which can be coated against the corrosive seawater. Instead of the elastomer bellows, one made of steel materials, preferably in the form of stainless steel, which then does not rust, can be used. In such a case, the bellows folds are not, as shown, trapezoidal, but have appropriate uniform curves (not shown).

In a chain of action and viewed in the longitudinal direction LR of the supporting housing 5, the pressure transmission device 17 and then the media chamber 11 are connected to the compensator device 35. Between the double piston 21, 27 of the pressure transmission device 17, a second media chamber 45 is arranged and holds a high-pressure medium. This high-pressure medium is a process gas, in particular nitrogen ($N_2$). The second media chamber 45 having the high-pressure medium is permanently connected to a pressure reservoir 47, which is located between the inner pipe 5 and outer pipe 3, via a bore 49 in the inner pipe 5. The pressure reservoir 47 concentrically envelops the supporting housing 5. A further, third media chamber 51, holding a low-pressure medium in the form of a process gas, in this case nitrogen ($N_2$), but preferably holding a vacuum, is arranged between the double piston 21, 27. The second and third media chamber 45, 51 are bordered by a piston partition wall 53 fixedly arranged in the supporting housing 5. In a bore 55 of the piston partition wall 53, a piston rod 57, at the respective end of which a piston 21, 27 of the double piston assembly 19 is mounted, is guided in a longitudinally displaceable manner. The pistons 21, 27 of the double piston assembly 19 and the piston partition wall 53 each have two circumferential grooves 59 in which annular sealing elements 61 are disposed as sealing arrangements as a sealing with respect to the inner wall 23 of the supporting housing 5. Furthermore, two inner circumferential grooves 63 are provided in the bore 55 in the piston partition wall, in which inner circumferential grooves two sealing elements 65 are also arranged. In this way the media chambers 11, 45, 51 and the seawater chamber 33 are separated from each other in a media-tight manner. In particular, the sealing elements 61 prevent the support fluid of the bellows 39 from penetrating to the media chamber side 51.

The bellows 39, the pistons 21, 27 and the piston partition wall 53 have a respective maximum outer diameter A, which is equal and corresponds to the uniform inner wall diameter I of the supporting housing 5.

FIG. 2 shows a detailed schematic depiction of the bellows 39 made of elastomeric material in the installed state. Each bellows fold 41 is formed of two flanks 67, 69 inclined at the same angle towards each other. The flanks enclose, in fictitious extension, an acute angle $\alpha$, which is located on the inner side 71 of the bellows 39. Beyond a pre-determinable flank length 73, the respective adjacent flanks 67, 69 of a bellows fold 41 turn in the direction of the inner side 71 into bond bridges 75 extending coaxially to the longitudinal axis LA of the bellows 39. The bond bridges 75 stiffen the adjacent flanks 67, 69 and form a virtual inner pipe 77 inside the bellows 39 with the adjacent bond bridges 75. At their root 79, each flank 67, 69 turns with a predeterminable bending radius r into a contact bridge 81. Each contact bridge 81 likewise extends coaxial to the longitudinal axis LA of the bellows 39 and remains in every movement position of the bellows 39 in a sliding contact with the inner wall 23 of the inner pipe 5. All contact bridges 81 in turn form a virtual outer pipe 83 of the bellows 39, which is concentric to the inner pipe 77. The bond bridges 75 and the contact bridges 81 brace the bellows 39 as a whole and cause the bellows deformation energy to be produced mainly or solely by flap-like movements of the flanks 67, 69 in the direction of the roots 79. The adjacent roots 79 of a bellows fold 41 move towards or away from each other at a decrease or increase of the volume limited by the bellows fold 41 at the height of the outer pipe 83, depending on whether the bellows 39 is compressed or expanded during operation. The deformation energy of the bellows 39 is thus provided only by the movement of the spring-loaded, resetting flanks 67, 69. To this end, the flanks 67, 69 are connected to the adjacent bond bridges 75 via joints 85. This arrangement ensures that the bond bridges 75 keep their concentric alignment relative to each other at all times during operation. The bellows 39 cannot warp or at least only very slightly even at very high seawater or operating pressures, so that the contact bridges 81 remain in every possible movement position of the bellows 39 in sliding contact with the inner wall 23 of the inner pipe 5, which inner wall forms a guide for the bellows 39. The bellows 39 and its bellows folds 41 are oriented rotation-symmetrically to the longitudinal axis LA of the device 1. To avoid tensions in the bellows folds 41, the contact bridges 81 and the bond bridges 75 have the same width and are filled using the support fluid mentioned.

The device 1 according to the invention is designed to be lowered to the seabed as part of a blowout preventer. The high ambient pressure of the seawater in, for instance, a depth of 3600 m, equivalent to 360 bar, acts on the device 1. The seawater acts on the compensator device 35 and the left piston 27 of the pressure transmission device 17 and generates a corresponding pressure in the medium in the first media chamber 11. In addition, the medium in the first media chamber 11 is pressurized by the high-pressure medium in the second media chamber 45. If now, in an emergency, the medium from the first media chamber 11 is drawn, the double piston assembly 17 moves to the right in the image plane. In this way, the compensator device 35 undergoes a change in length because it is coupled to the double piston assembly 17 and the supporting housing 5 at its end. The compensator device 35 advantageously protects the inner wall of the supporting housing 5, regardless of the position of the double piston assembly 19, from any contact with the corrosive seawater.

The invention thus demonstrates a particularly advantageous device 1 for adjusting a media pressure relative to an ambient pressure. The compensator device 35 at least partially protects the device 1 from the corrosive seawater. Surprisingly, the usage of such a compensator device 35 is demonstrated to be inexpensive, if it prevents expensive components, such as the inner wall 23 of the supporting housing 5, from coming into contact with the seawater and they are thus preserved. Further, the series connection of two or more compensator elements 41 effects a redundancy. In addition, a bellows 39 having such compensator elements 41 has proven to be more robust than a bladder accumulator known from the prior art. Preferably, although not shown, the overall device can be stepped, in particular that the seawater pressure transmission part having the bellows has a smaller diameter than the double piston assembly.

While one embodiment has been chosen to illustrate the invention, it will be understood by those skilled in the art that various changes and modifications can be made therein without departing from the scope of the invention as defined in the claims.

The invention claimed is:

1. A device for adjusting a media pressure relative to an ambient pressure defined by a depth-dependent seawater pressure when in use, comprising:

a compensator device having seawater pressure applied thereto, and being able to have a reversible change in length or elongation, said compensator device including at least two compensator elements provided in series in a direction of the reversible change in length or elongation;

a supporting housing enclosing said compensator device and a first media chamber having media pressure;

a seawater chamber in said compensator device with a media-tight seal between said seawater chamber and said media chamber; and a pressure transmission device with said compensator device, said pressure transmission device and said first media chamber being arranged and connected in said supporting housing in sequence in a longitudinal direction of said supporting housing, said longitudinal direction being a chain of action of said compensator device and said pressure transmission device, said pressure transmission device including a double piston assembly with a first piston adjacent said seawater chamber and with a second piston adjacent to said media chamber.

2. A device according to claim 1 wherein said compensator elements are at least partially resilient or elastic and undergo a change in length or elongation in a first direction by the seawater pressure and in a return direction to an initial position thereof upon removal of the seawater pressure in a reverse movement.

3. A device according to claim 2 wherein said compensator device comprises bellows having individual bellows folds being arranged in sequence and at least in part forming a wall of said bellows, said bellows folds forming said compensator elements.

4. A device according to claim 3 wherein said bellows comprises a front sealing wall exposed to seawater, said front sealing wall being coupled to said pressure transmission device and being set back in a direction of said pressure transmission device with respect to an entry point of the sea water.

5. A device according to claim 1 wherein a second media chamber holding a high-pressure medium is arranged between said first and second pistons.

6. A device according to claim 5 wherein said second media chamber is permanently connected in fluid communication to a pressure reservoir.

7. A device according to claim 6 wherein said pressure reservoir envelops said supporting housing.

8. A device according to claim 5 wherein a third media chamber holding a low-pressure medium is disposed between said first and second pistons, said second and third media chambers are bordered and separated by a piston partition wall; and a piston rod connects said first and second pistons at opposite ends of said piston rod, and is mounted in and guided for longitudinal movement is said piston partition wall.

9. A device according to claim 8 wherein said low-pressure medium is a vacuum.

10. A device according to claim 8 wherein said compensator device comprises bellows having individual bellows folds being arranged in sequence and at least in part forming a wall of said bellows, said bellows folds forming said compensator elements; and said bellows, said first and second pistons and said piston partition wall have respective maximum outer diameters that equal and corresponds to a uniform inner diameter of said supporting housing.

11. A device according to claim 1 wherein said first piston is sealed to an inner wall of said supporting housing by a seal.

12. A device according to claim 1 wherein said compensator device comprises bellows having individual bellows folds being arranged in sequence and at least in part forming a wall of said bellows, said bellows folds forming said compensator elements.

13. A device according to claim 7 wherein said compensator device comprises bellows having individual bellows folds being arranged in sequence and at least in part forming a wall of said bellows, said bellows folds forming said compensator elements.

14. A device according to claim 7 wherein said compensator device comprises bellows having individual bellows folds being arranged in sequence and at least in part forming a wall of said bellows, said bellows folds forming said compensator elements.

15. A device according to claim 5 wherein said compensator device comprises bellows having individual bellows folds being arranged in sequence and at least in part forming a wall of said bellows, said bellows folds forming said compensator elements.

16. A device according to claim 6 wherein said compensator device comprises bellows having individual bellows folds being arranged in sequence and at least in part forming a wall of said bellows, said bellows folds forming said compensator elements.

17. A device according to claim 8 wherein said compensator device comprises bellows having individual bellows folds being arranged in sequence and at least in part forming a wall of said bellows, said bellows folds forming said compensator elements.

* * * * *